(12) United States Patent
Paulsburg

(10) Patent No.: US 8,510,594 B2
(45) Date of Patent: Aug. 13, 2013

(54) CONTROL SYSTEM, CONTROL COMPUTER AND METHOD FOR OPERATING A CONTROL SYSTEM

(75) Inventor: Axel Paulsburg, Cremlingen (DE)

(73) Assignee: Siemens Aktiengesellschaft, Munich (DE)

( * ) Notice: Subject to any disclaimer, the term of this patent is extended or adjusted under 35 U.S.C. 154(b) by 235 days.

(21) Appl. No.: 12/995,333

(22) PCT Filed: May 26, 2009

(86) PCT No.: PCT/EP2009/056343
§ 371 (c)(1),
(2), (4) Date: Nov. 30, 2010

(87) PCT Pub. No.: WO2009/144207
PCT Pub. Date: Dec. 3, 2009

(65) Prior Publication Data
US 2011/0078491 A1 Mar. 31, 2011

(30) Foreign Application Priority Data
May 30, 2008 (DE) .......................... 10 2008 026 574

(51) Int. Cl.
*G06F 11/00* (2006.01)
(52) U.S. Cl.
USPC ........................................................ 714/5.1
(58) Field of Classification Search
USPC ........................................................ 714/5.1
See application file for complete search history.

(56) References Cited

U.S. PATENT DOCUMENTS

| 3,882,406 | A | 5/1975 | Graves et al. |
| 5,583,769 | A | 12/1996 | Saitoh |
| 6,275,752 | B1 | 8/2001 | Giers |
| 7,120,820 | B2 | 10/2006 | Lehmann |
| 7,509,520 | B1 * | 3/2009 | Nguyen et al. ................. 714/4.2 |
| 2003/0233540 | A1 * | 12/2003 | Banerjee et al. .............. 713/153 |
| 2012/0173671 | A1 * | 7/2012 | Callaghan et al. ............ 709/217 |

FOREIGN PATENT DOCUMENTS

| DE | 197 20 618 A1 | 11/1998 |
| DE | 10 2005 008 556 A1 | 8/2006 |
| SU | 1062906 A1 | 12/1983 |
| SU | 1736018 A1 | 5/1992 |
| SU | 1741295 A1 | 6/1992 |
| WO | 02/01305 A1 | 1/2002 |

* cited by examiner

*Primary Examiner* — Michael Maskulinski
*Assistant Examiner* — Neil Miles
(74) *Attorney, Agent, or Firm* — Laurence A. Greenberg; Werner H. Stemer; Ralph E. Locher

(57) ABSTRACT

A particularly simple and simultaneously fail-safe control system has a control computer for interchanging data with at least one peripheral, and at least one further control computer connected to the first-mentioned control computer via a communication channel. The further control computer is configured to assume at least part of the functionality of the control computer. The control computer is designed, in the event of partial failure thereof, to forward data received by the further control computer via the communication channel to the peripheral and/or to forward data received by the peripheral to the further control computer via the communication channel. There is also provided such a control computer and a method for operating a control system.

14 Claims, 2 Drawing Sheets

CONTROL SYSTEM, CONTROL COMPUTER AND METHOD FOR OPERATING A CONTROL SYSTEM

BACKGROUND OF THE INVENTION

Field of the Invention

The present invention relates to a control system having a control computer, which is intended to interchange data with at least one peripheral, and at least one further control computer which is connected to the control computer via a communication channel and is designed to assume at least part of the functionality of the control computer.

Such a control system is known, for example, from the published international patent application WO 02/01305 A1. Said application describes a redundant control system in which a peripheral is connected both to a first control computer and to a second control computer. The two control computers synchronously execute the same control program, in which case a communication channel in the form of a redundant coupling is provided in order to synchronize said computers. If the control system detects failure of one of the two control computers, the system changes over to the other control computer which then interchanges data directly with the peripheral.

BRIEF SUMMARY OF THE INVENTION

The present invention is based on the object of specifying a particularly simple and, at the same time, fail-safe control system.

According to the invention, this object is achieved by a control system of the type mentioned at the outset, in which the control computer is designed, in the event of its partial failure, to forward data received from the further control computer via the communication channel to the peripheral and/or to forward data received from the peripheral to the further control computer via the communication channel.

The control system according to the invention affords the advantage that it is possible to dispense with a redundant design of the control computer. This is enabled by virtue of the fact that the control computer is designed in such a manner that, even in the event of its partial failure, it can at least still be used to forward the data. This makes it possible for the further control computer to assume the functionality, that is to say the processing function, of the failed control computer without the need for the peripheral(s) to be directly connected to the further control computer. This advantageously dispenses with the need for the peripheral(s) to be correspondingly connected to a plurality of control computers.

Redundant control systems are known, for example, as so-called 2×2v2 systems in which 2 independent reliable 2v2 systems, that is to say two separate two-channel systems in each case, are used. In comparison with this, the control system according to the invention requires fewer components, thus saving effort and costs. At the same time, however, the failure safety of the control system remains substantially unaffected by this.

The control system according to the invention is preferably developed in such a manner that at least one further peripheral is associated with the further control computer, and the further control computer is intended to interchange further data with the further peripheral. This affords the advantage that the further control computer itself can be used to interchange data with at least one further peripheral and to control at least one further peripheral. This means that, in the event of partial failure of the control computer, the further control computer assumes the functionality of the control computer or at least part of this functionality in addition to its actual tasks. This has the advantage that there is no need for an additional control computer in order to interchange the further data with the at least one further peripheral.

In principle, the control computer can be a computer with any desired architecture and any desired design. This includes, for example, any desired hardware configurations and operating systems. In another particularly preferred embodiment of the control system according to the invention, the control computer is a multi-channel reliable computer. This affords the advantage that, if a channel in a 2v2 computer fails for example, the channel which has not failed admittedly can no longer alone ensure reliable processing, but this channel can nevertheless still be used to forward, that is to say to route, data. The peripheral(s) connected to the control computer is/are actually controlled in this case using the further control computer which has not failed and is preferably likewise a multi-channel reliable computer.

In one preferred embodiment, the control system according to the invention is configured in such a manner that it is designed to transmit the data forwarded by the control computer from the further control computer to the peripheral and/or to transmit the data forwarded by the control computer from the peripheral to the further control computer in a manner protected against corruption. This is advantageous since it makes it possible to check the integrity of the transmitted data for safety-relevant applications. If, for example, a channel in the control computer has failed, it is not possible to preclude that the remaining channel which has not failed and is now used exclusively to forward or pass the data possibly corrupts the data forwarded by it on account of an additional undiscovered failure. Said preferred embodiment of the control system according to the invention now makes it possible for the peripheral and/or the further control computer to detect corresponding corruption and to initiate corresponding measures, for instance in the form of rejecting the transmitted data, repeating the transmission of the data and/or outputting a fault signal. The corruption can be detected, for example, by evaluating a signature, for instance in the form of a hash value, for the transmitted data.

The control system according to the invention can preferably also be designed in such a manner that the control computer is designed to assume at least part of the functionality of the further control computer, and the further control computer is designed, in the event of its partial failure, to forward data received from the control computer via the communication channel to the further peripheral and/or to forward data received from the further peripheral to the control computer via the communication channel. This affords the advantage that, in the event of partial failure of the further control computer, data transmission and control are enabled using the control computer. This means that the control computer and the further control computer can reciprocally assume the functionality or processing function of the respective other control computer. As an alternative to this, it is also conceivable, for example, for an additional control computer, rather than the control computer, to be designed to assume the functionality of the further control computer. This means that, if a control computer fails in a control system having networked control computers, the function of said control computer can, in principle, be assumed entirely or else partially by one of the other control computers. In this case, it is also conceivable, in particular, for a plurality of control computers to together assume the processing function of a failed control computer. In this case, it is necessary for the failed control computer to be designed to forward the data to or from the plurality of control computers.

In another particularly preferred embodiment of the control system according to the invention, the peripheral is a sensor or an actuator. This is advantageous since failure safety is very important, in particular, when controlling such peripherals. In addition, it is often desirable for sensors or actuators to have to be connected to only one control computer rather than having to be additionally connected to a further control computer for redundancy reasons.

The control system according to the invention may, in principle, be part of any desired superordinate system. In one particularly preferred development, the control system is part of a railroad protection technology system or automation technology system. This is advantageous since corresponding systems impose particularly high demands on failure safety and generally connect a multiplicity of peripherals to control computers. In the case of a railroad protection technology system, corresponding peripherals may be, for example, a points contact, a signal, a points drive or an actuator, and, in the case of an automation technology system, corresponding peripherals may be, for example, process control sensors or actuators in a factory.

The invention also relates to a control computer for a control system having a control computer, which is intended to interchange data with at least one peripheral, and at least one further control computer which is connected to the control computer via a communication channel and is designed to assume at least part of the functionality of the control computer.

With regard to the control computer, the present invention is based on the object of specifying a control computer which enables a particularly simple and, at the same time, fail-safe design of the control system.

For a control computer of the type mentioned above, this object is achieved, according to the invention, by the fact that the control computer is designed, in the event of its partial failure, to forward data received from the further control computer via the communication channel to the peripheral and/or to forward data received from the peripheral to the further control computer via the communication channel.

The advantages of the control computer according to the invention substantially correspond to the advantages mentioned above in connection with the control system according to the invention. The control computer according to the invention thus affords the advantage, in particular, that it is possible to dispense with a redundant design for the purpose of failure safety.

In one preferred development of the control computer according to the invention, the control computer is a multi-channel reliable computer. In accordance with the above explanations of the corresponding embodiment of the control system according to the invention, this affords the advantage that, if one of the channels in the reliable computer fails, a further channel or the further channel in the reliable computer is available for forwarding the data from or to the further computer.

The control computer according to the invention is preferably configured in such a manner that it is designed to assume the functionality of the further control computer. This affords the advantage that the control computer can additionally be used for failure protection of the further control computer.

In addition, the invention relates to a method for operating a control system having a control computer, which is intended to interchange data with at least one peripheral, and a further control computer which is connected to the control computer via a communication channel and is designed to assume at least part of the functionality of the control computer.

With regard to the method, the present invention is based on the object of specifying a particularly simple and, at the same time, fail-safe method for operating a control system.

For a method of the type mentioned above, this object is achieved, according to the invention, by virtue of the fact that the control computer, in the event of its partial failure, forwards data received from the further control computer via the communication channel to the peripheral and/or forwards data received from the peripheral to the further control computer via the communication channel.

With regard to the advantages of the method according to the invention, reference is made to the advantages mentioned in connection with the control system according to the invention and the control computer according to the invention.

The method according to the invention is advantageously developed in such a manner that the data forwarded by the control computer from the further control computer to the peripheral and/or the data forwarded by the control computer from the peripheral to the further control computer are transmitted in a manner protected against corruption. This prevents undetected corruption of the transmitted data, in particular by the failed control computer being used for forwarding.

The invention is explained in more detail below using exemplary embodiments. In this respect

DESCRIPTION OF THE INVENTION

Figure 1:
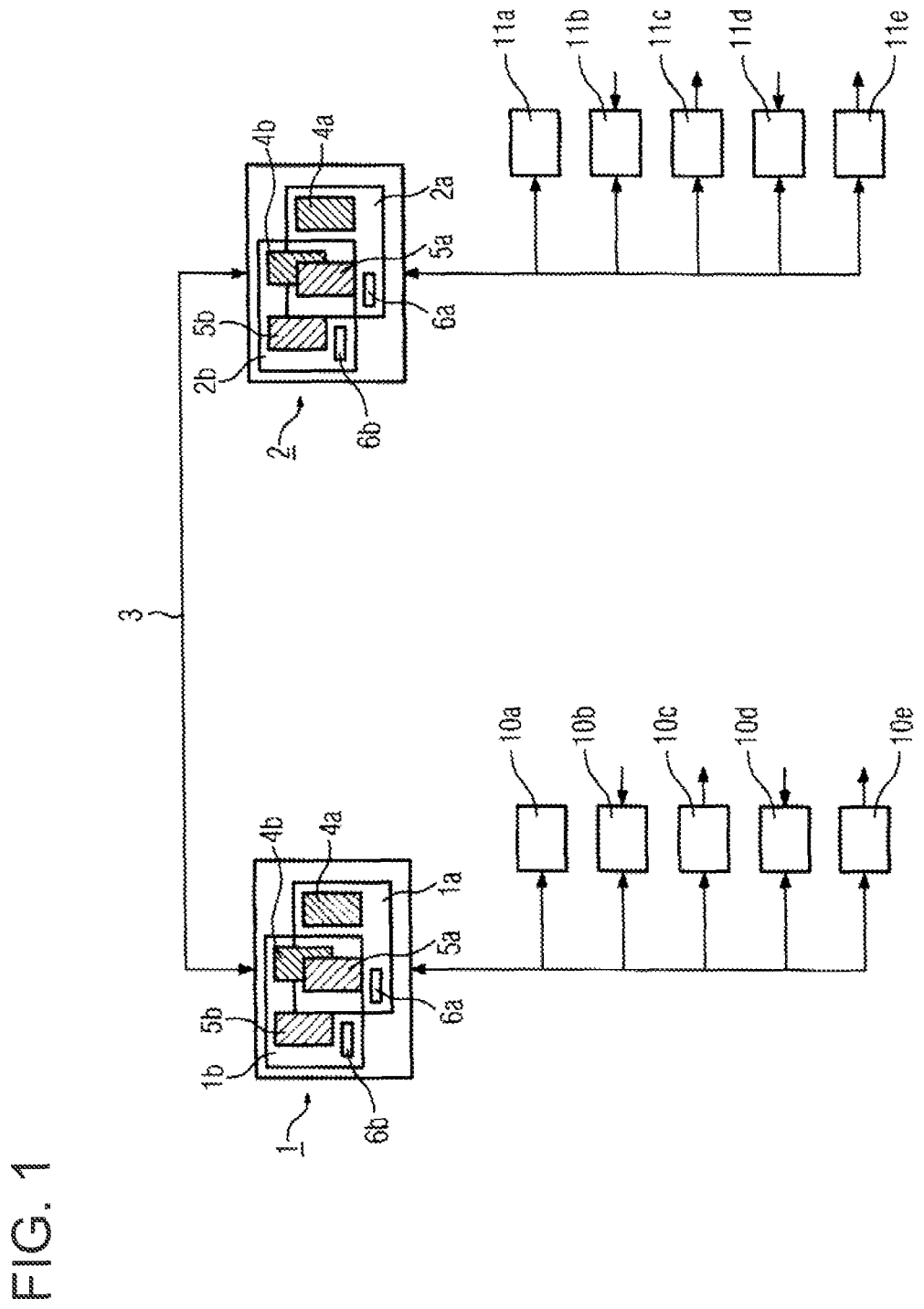
FIG. 1 shows an exemplary embodiment of the control system according to the invention in the fault-free state.

FIG. 1 shows an exemplary embodiment of the control system according to the invention in the fault-free state. In detail, a control system having a control computer 1 and a further control computer 2 is shown. The control computer 1 and the further control computer 2 are connected to one another via a communication channel 3. In this case, the communication channel 3 may be of any desired type (wireless or wired), with the result that the control computer 1 and the further control computer 2 can be arranged at any desired distance from one another, for example.

In the exemplary embodiment in FIG. 1, both the control computer 1 and the further control computer 2 are in the form of a two-channel reliable computer, that is to say in the form of a 2v2 system. This means that the control computer 1 has a first channel 1a and a second channel 1b. The same applies to the further control computer with respect to the two channels 2a and 2b. It is pointed out that the channels 1a, 1b, 2a, 2b may also be independent components, for instance in the form of a respective PC (personal computer), which form the respective control computer 1 or 2 together with further components.

In the exemplary embodiment in FIG. 1, the channels 1a, 1b, 2a, 2b each have both a processing function 4a, 4b for the functionality of the control computer 1 and a further processing function 5a, 5b for the functionality of the further control computer 2. In this case, in the state which is illustrated in FIG. 1 and in which there is no failure, the processing function of the respective other control computer 1, 2 is inactive in the respective control computer 1, 2. This means that only the processing function 4a, 4b for the control computer 1 is active in the control computer 1 and only the processing function 5a, 5b for the further control computer 2 is active in the further control computer 2.

The processing functions 4a, 4b each run simultaneously and in a parallel manner in the two channels 1a, 1b in the control computer 1; a corresponding situation applies to the processing functions 5a, 5b of the further control computer 2 with respect to the channels 2a, 2b in the further control computer 2. In order to protect against malfunctions of the individual channels 1a, 1b or 2a, 2b, the processing results from the two channels 1a, 1b or 2a, 2b are respectively compared in this case by a comparison device (not illustrated in FIG. 1 for reasons of clarity) in the respective control computer 1, 2.

In addition, the control computer 1 and the further control computer 2 each comprise a functionality 6a, 6b for forwarding data respectively received from the other control computer 2 or 1. However, this functionality 6a, 6b is inactive in the normal fault-free state shown in FIG. 1. This means that, in the normal state of the control system, data are interchanged with peripherals 10a, 10b, 10c, 10d, 10e solely by the control computer 1 and data are interchanged with further peripherals 11a, 11b, 11c, 11d, 11e solely by the further control computer 2.

If the control system is, for example, a railroad protection technology system, the peripheral 10a may be, for example, a reliable input/output system, the peripheral 10b may be a points contact, the peripheral 10c may be an actuator in the form of a signal, the peripheral 10d may be a sensor and the peripheral 10e may be an actuator in the form of a points drive. The peripherals 10a, 10b, 10c, 10d, 10e and the further peripherals 11a, 11b, 11c, 11d, 11e are advantageously connected to the control computer 1 and to the further control computer 2, respectively, in such a manner that the data are transmitted in a manner protected against corruption.

Figure 2:
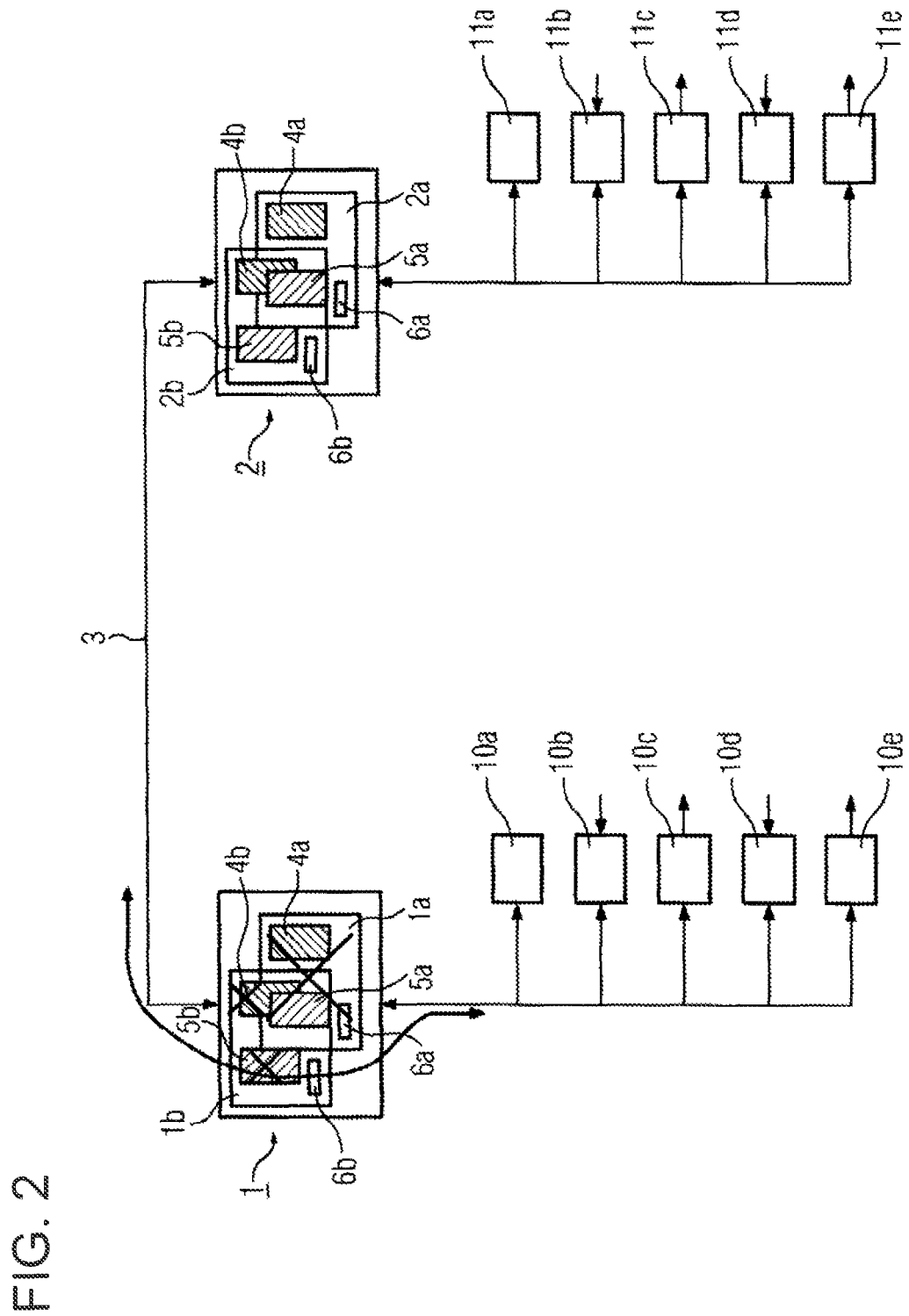
FIG. 2 shows the exemplary embodiment of the control system according to the invention from FIG. 1 in a state in which one of the control computers has at least partially failed.

FIG. 2 is used below to explain how the control system behaves in the event of partial failure of the control computer 1.

FIG. 2 shows the exemplary embodiment of the control system according to the invention from FIG. 1 in a state in which one of the control computers has at least partially failed. In this case, components which are unchanged with respect to FIG. 1 are denoted using the same reference symbols in each case.

In contrast to FIG. 1, FIG. 2 illustrates a state of the control system in which the channel 1a in the control computer 1 has failed. Since it is no longer possible to reliably interchange data between the control computer 1 and the peripherals 10a to 10e, the control computer 1 forwards data received from the peripherals 10a, 10b, 10c, 10d, 10e to the further control computer 2 via the communication channel 3. At the same time, the processing function 4a, 4b of the control computer 1 is activated in the further control computer 2. Corresponding activation can be effected, for example, using a signal from that channel 1b in the control computer 1 which has not failed, which signal is received via the communication channel 3.

Furthermore, on account of the fact that the failure of the channel 1a in the control computer 1 has been detected, the forwarding functionality 6b of the channel 1b is activated. In addition, the processing functions 4b, 5b of that channel 1b in the control computer 1 which has not failed are switched off since they are now no longer used.

As a result, data transmitted to the peripherals 10a, 10b, 10c, 10d, 10e, that is to say actuating commands for an actuator for example, are passed through to the relevant peripheral 10a, 10b, 10c, 10d, 10e by that channel 1b in the control computer 1 which has not failed. In this case, as already stated above, the peripherals 10a, 10b, 10c, 10d, 10e are advantageously connected to the control computer 1 via a reliable input/output system. Data transmitted from the peripherals 10a, 10b, 10c, 10d, 10e, that is to say from sensors for example, to the control computer 1 are likewise forwarded by the forwarding function 6b, that is to say the routing functionality, of the control computer 1 to the further control computer 2 for further, reliable or protected processing.

The processing function 5a, 5b of the further control computer 2 is affected by the further control computer 2 assuming the processing function 4a, 4b of the control computer 1 only insofar as the further control computer 2 must provide the power for all of the processing functions 4a, 4b, 5a, 5b. In this case, it is necessary for the communication channel 3 to be designed in such a manner that it is able to transmit the data which have been forwarded or need to be forwarded. The time delay resulting from the forwarding of the data should be designed for the properties of the processes, for example of railroad protection technology, connected to the peripherals 10a, 10b, 10c, 10d, 10e in order to avoid the functionality of these processes being impaired.

In accordance with the above statements, the control system illustrated is particularly advantageous in safety-relevant applications when the connected peripherals 10a, 10b, 10c, 10d, 10e, that is to say actuator or sensor systems for example, are independently designed to check the actuating commands for the actuators or the coding of the sensor data for corruption. The reason for this is that, in the event of a failed channel 1a in the control computer 1, it must be assumed that the remaining channel 1b which thus has not failed and is now exclusively used to forward the data could possibly corrupt the forwarded data on account of a further undiscovered failure.

In accordance with the above statements, the control system described has the advantage, in particular, that it is possible to dispense with a redundant design of the individual control computers 1, 2. This is made possible by networking the control computers 1, 2 by means of the communication channel 3 and using the failed control computer 1 to forward data between the further control computer 2, which assumes the functionality of the control computer, and the peripherals 10a, 10b, 10c, 10d, 10e. In this case, the control computer 1 can use, for example, a remaining functional channel 1b in the control computer 1 to forward the data.

The invention claimed is:

1. A control system, comprising:
   a first control computer configured for interchanging data with at least one peripheral;
   at least one second control computer connected to said first control computer via a communication channel, said second control computer being configured to assume at least a part of a functionality of said first control computer;
   said first control computer being configured, in an event of a partial failure thereof, to forward data received from said second control computer via the communication channel to the peripheral and/or to forward data received from the peripheral to said second control computer via the communication channel.

2. The control system according to claim 1, wherein:
   at least one further peripheral is associated with said second control computer; and said second control computer is configured to interchange further data with the further peripheral.

3. The control system according to claim 1, wherein said first control computer is a multi-channel reliable computer.

4. The control system according to claim 1, configured for transmitting the data received from said second control computer and forwarded by said first control computer to the peripheral and/or transmitting the data received by said first control computer from the peripheral to said second control computer in a corruption-protected fashion.

5. The control system according to claim 2, wherein:
said first control computer is configured to assume at least part of a functionality of said second control computer; and
said second control computer is configured, in an event of a partial failure thereof, to forward data received from said first control computer via the communication channel to the further peripheral and/or to forward data received from the further peripheral to said first control computer via the communication channel.

6. The control system according to claim 1, wherein the at least one peripheral is a sensor or an actuator.

7. The control system according to claim 1, integrated in a railroad protection technology system or automation technology system.

8. In a control system having a first control computer configured to interchange data with at least one peripheral, and at least one second control computer connected to the first control computer via a communication channel and configured to assume at least a part of a functionality of the first control computer, a control computer for the control system, the first control computer being configured:
in the event of a partial failure thereof,
to forward data received from the second control computer via the communication channel to the peripheral; and/or
to forward data received from the peripheral to the second control computer via the communication channel.

9. The control computer according to claim 8, configured as a multi-channel reliable computer.

10. The control computer according to claim 8, configured to assume the functionality of the second control computer.

11. A method of operating a railroad protection control system, the method which comprises:
providing a first control computer of the railroad protection control system configured to interchange data with at least one peripheral of the railroad protection system;
providing at least one second control computer connected to the first control computer via a communication channel and configured to assume at least a part of a functionality of the first control computer;
in the event of a partial failure of the first control computer, forwarding with the first control computer data received from the second control computer via the communication channel to the peripheral and/or forwarding data received from the peripheral to the second control computer via the communication channel.

12. The method according to claim 11, which comprises transmitting the data forwarded by the first control computer from the second control computer to the peripheral and/or the data forwarded by the first control computer from the peripheral to the second control computer in a manner protected against corruption.

13. The method according to claim 11, wherein the peripheral of the railroad protection system is selected from the group consisting of an input/output system, a points contact, a signal actuator, a sensor, and a points drive.

14. A railroad protection control system, comprising:
a first control computer configured for interchanging data with at least one peripheral of a railroad protection system selected from the group consisting of an input/output system, a points contact, a signal actuator, a sensor, and a points drive;
at least one second control computer connected to said first control computer via a communication channel, said second control computer being configured to assume at least a part of a functionality of said first control computer;
said first control computer being configured, in an event of a partial failure thereof, to forward data received from said second control computer via the communication channel to the peripheral and/or to forward data received from the peripheral to said second control computer via the communication channel.

* * * * *